(12) United States Patent
Lin et al.

(10) Patent No.: US 8,074,004 B2
(45) Date of Patent: Dec. 6, 2011

(54) ELECTRONIC DEVICE FOR CONTENTION DETECTION OF BIDIRECTIONAL BUS AND RELATED METHOD

(75) Inventors: Ching-Chun Lin, Taipei County (TW); Shang-I Liu, Kaohsiung (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 114 days.

(21) Appl. No.: 12/267,613

(22) Filed: Nov. 9, 2008

(65) Prior Publication Data

US 2009/0254687 A1    Oct. 8, 2009

(30) Foreign Application Priority Data

Apr. 2, 2008   (TW) ................................ 97111994 A (51) Int. Cl.
*G06F 13/00* (2006.01)
*H04L 12/413* (2006.01)
*H04L 12/43* (2006.01)

(52) U.S. Cl. .................. 710/107; 370/477; 370/461

(58) Field of Classification Search .................. 710/107; 370/447, 461
See application file for complete search history.

(56) References Cited

U.S. PATENT DOCUMENTS

| | | | | | |
|---|---|---|---|---|---|
| 4,063,220 | A | * | 12/1977 | Metcalfe et al. | 370/462 |
| 4,234,952 | A | * | 11/1980 | Gable et al. | 370/448 |
| 4,409,592 | A | * | 10/1983 | Hunt | 370/447 |
| 4,513,427 | A | * | 4/1985 | Borriello et al. | 375/360 |
| 4,521,891 | A | * | 6/1985 | Biba et al. | 375/222 |
| 4,602,252 | A | * | 7/1986 | Nakata et al. | 340/3.41 |
| 4,723,309 | A | * | 2/1988 | Mochizuki et al. | 398/37 |
| 4,727,592 | A | * | 2/1988 | Okada et al. | 714/55 |
| 4,751,701 | A | * | 6/1988 | Roos et al. | 370/445 |
| 4,918,688 | A | * | 4/1990 | Krause et al. | 370/257 |
| 5,012,467 | A | * | 4/1991 | Crane | 370/445 |
| 5,097,495 | A | * | 3/1992 | Gray et al. | 378/117 |
| 5,251,203 | A | * | 10/1993 | Thompson | 370/407 |
| 5,459,660 | A | * | 10/1995 | Berra | 701/33 |

(Continued)

FOREIGN PATENT DOCUMENTS

JP        60117843 A  *  6/1985

(Continued)

OTHER PUBLICATIONS

Lin et al., "Self-synchronizing communication protocols," May 1989, IEEE, IEEE Transactions on Computers, vol. 38, No. 5, pp. 609-625.*

(Continued)

*Primary Examiner* — Faisal M Zaman
(74) *Attorney, Agent, or Firm* — Winston Hsu; Scott Margo (57) ABSTRACT

An electronic device of detecting contention of a bidirectional bus for avoiding failing to drive a bidirectional bus due to bus contention includes: an output terminal, an input terminal and a data output unit, a timing comparing controller and a comparing unit. The output terminal is coupled to the bidirectional bus and used for outputting a data output signal to the bidirectional bus. The input terminal is coupled to the output terminal and the bidirectional bus and used for receiving a data reception signal from the bidirectional bus. The data output unit is used for providing the data output signal. The timing comparing controller is used for generating a timing comparison signal according to the data output signal. The comparing unit is used for comparing the data reception signal with the data output signal according to the timing comparison signal to determine a contention state of the bidirectional bus.

8 Claims, 7 Drawing Sheets

U.S. PATENT DOCUMENTS

| | | | | |
|---|---|---|---|---|
| 5,469,473 A | * | 11/1995 | McClear et al. | 375/219 |
| 5,636,343 A | * | 6/1997 | Asano et al. | 712/38 |
| 5,754,799 A | * | 5/1998 | Hiles | 710/110 |
| 5,790,603 A | * | 8/1998 | Maeda et al. | 375/342 |
| 5,859,851 A | * | 1/1999 | Young et al. | 370/447 |
| 6,016,521 A | * | 1/2000 | Matsubara | 710/34 |
| 6,018,513 A | * | 1/2000 | Okamoto et al. | 370/212 |
| 6,054,997 A | * | 4/2000 | Mirtich | 345/619 |
| 6,078,588 A | * | 6/2000 | Dove et al. | 370/412 |
| 6,598,171 B1 | * | 7/2003 | Farmwald et al. | 713/401 |
| 6,894,602 B2 | * | 5/2005 | Browning | 340/286.02 |
| 7,358,785 B2 | * | 4/2008 | Boerstler et al. | 327/172 |
| 2007/0176656 A1 | * | 8/2007 | Lesso | 327/158 |

FOREIGN PATENT DOCUMENTS

| | | | | |
|---|---|---|---|---|
| JP | 61281741 A | * | 12/1986 | |
| JP | 62266941 A | * | 11/1987 | |
| JP | 63171037 A | * | 7/1988 | |
| JP | 63175548 A | * | 7/1988 | |
| JP | 03057339 A | * | 3/1991 | |
| JP | 09261839 A | * | 10/1997 | |

OTHER PUBLICATIONS

"NB80013514: Address/Timing Control", Jan. 1, 1980, IBM, IBM Technical Disclosure Bulletin, vol. 22, Iss. 8B, pp. 3514-3516.*

"NN8901313: Transmission Code for CSMA/CD", Jan. 1, 1989, IBM, IBM Technical Disclosure Bulletin, vol. 31, Iss. 8, pp. 313-314.*

"NN86013280: Non-Coherent Collision Detection", Jan. 1, 1986, IBM, IBM Technical Disclosure Bulletin, vol. 28, Iss. 8, pp. 3280-3282.*

* cited by examiner

ELECTRONIC DEVICE FOR CONTENTION DETECTION OF BIDIRECTIONAL BUS AND RELATED METHOD

BACKGROUND OF THE INVENTION

1. Field of the Invention

The present invention relates to an electronic device and related method for detection of bus contention, and more particularly, to an electronic device of detecting contention of a bidirectional bus and related method.

2. Description of the Prior Art

A bus is a transmission interface capable of transmitting data between two electronic devices or among a plenty of electronic devices. In general, buses are classified with unidirectional and a bidirectional types. The unidirectional bus is allowed to transmit data from an X device to a Y device, but not from the Y device to the X device. The bidirectional bus is allowed to exchange data between the X and Y devices. In implementation of a chip, employment of the bidirectional bus interface has a need of fewer pins than employment of the unidirectional bus.

Figure 1:
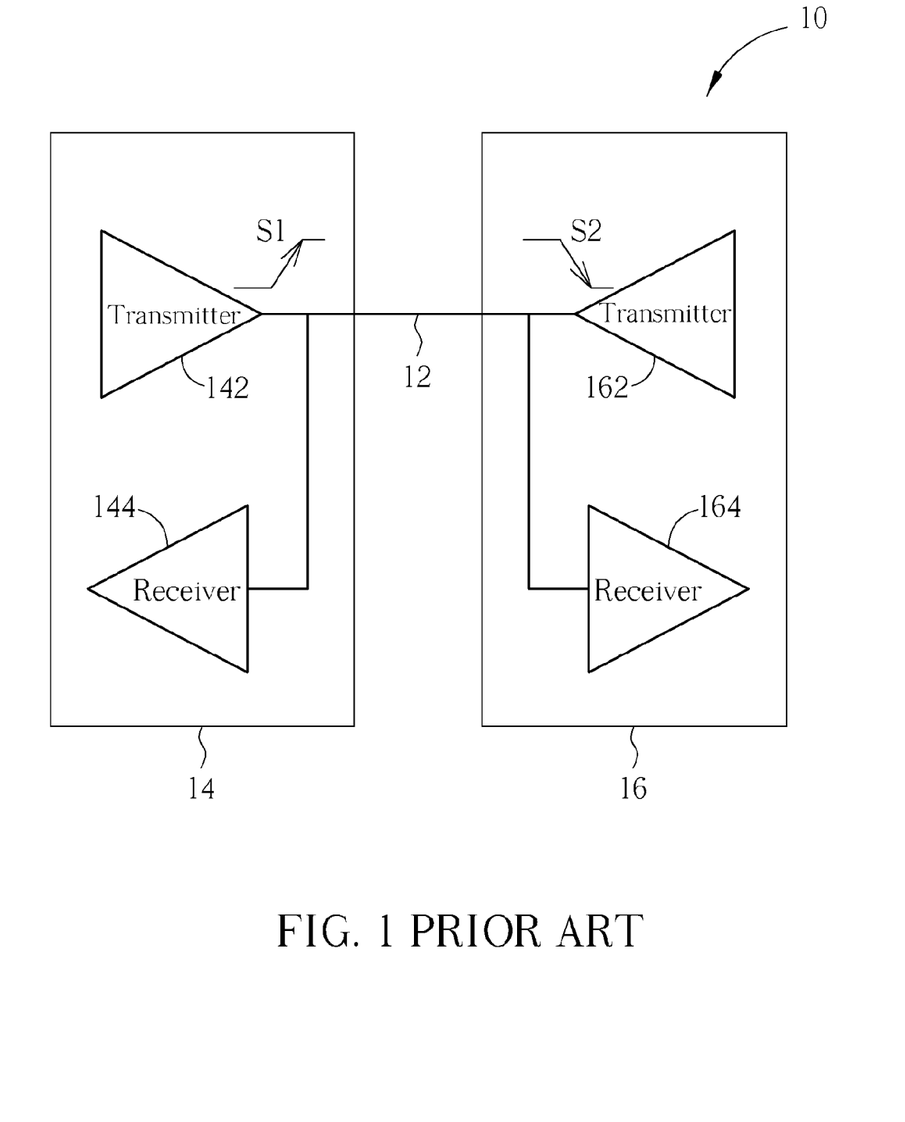
FIG. 1 is a schematic diagram of a master-slave system according to the prior art.

Please refer to FIG. 1, which is a schematic diagram of a master-slave system 10 according to the prior art. The master-slave system 10 employs a half-duplex bidirectional bus 12 for data transmission between a master device 14 and a slave device 16. The master device 14 includes a transmitter 142 and a receiver 144, whereas the slave device 16 includes a transmitter 162 and a receiver 164. In normal situation, the receiver 164 performs data receptions and no data is allowed to be transmitted from the transmitter 162 when the transmitter 142 outputs a data signal S1. Similarly, the receiver 144 performs data reception and no data is allowed to be transmitted by the transmitter 142 when the transmitter 162 outputs a data signal S2. That is, only one transmitting side is allowed to drive the bidirectional bus 12 at one time. As a result, the master device 14 and the slave device 16 have to contend for every transmission opportunity. However, the bidirectional bus 12 is likely to be simultaneously driven by the master device 14 and the slave device 16 due to occurrence of a signal transition during bus contention. This causes an operating failure in the bidirectional bus 12. For example, when the data signals S1 and S2 are simultaneously outputted to the bidirectional bus 12 as can be seen from FIG. 1, the transitions of the data signals S1 and S2 cause signal cancelling, thereby resulting in data reception failures in the receivers 164 and 144.

SUMMARY OF THE INVENTION

The present invention therefore provides an electronic device of detecting contention of a bidirectional bus and related method that can avoid failing to output data to the bidirectional bus due to transmission collision.

The present invention discloses an electronic device of detecting contention of a bidirectional bus. The electronic device includes an output terminal, an input terminal, a data output unit, a timing comparing controller and a comparing unit. The output terminal is coupled to the bidirectional bus and used for outputting a data output signal to the bidirectional bus. The input terminal is coupled to the output terminal and the bidirectional bus and used for receiving a data reception signal from the bidirectional bus. The data output unit is used for providing the data output signal. The timing comparing controller is used for generating a timing comparison signal according to the data output signal. The comparing unit is coupled to the input terminal, the data output unit, and the timing comparing controller and used for comparing the data reception signal with the data output signal according to the timing comparison signal to determine a contention state of the bidirectional bus.

The present invention further discloses a method of detecting contention of a bidirectional bus used for transmitting a data output signal and receiving a data reception signal. The method includes generating a timing comparison signal according to the data output signal before the bidirectional bus transmits the data output signal, and then comparing the data reception signal with the data output signal according to the timing comparison signal to determine a contention state of the bidirectional bus.

The present invention further discloses an electronic device of detecting contention of a bidirectional bus. The electronic device includes an output terminal, an input terminal, a data output unit, a sampling timing generator, a sampling unit, a detection timing generator and a comparing unit. The output terminal is coupled to the bidirectional bus and used for outputting a data output signal to the bidirectional bus. The input terminal is coupled to the output terminal and the bidirectional bus, and used for receiving a data reception signal from the bidirectional bus. The data output unit is used for providing the data output signal. The sampling timing generator is coupled to the data output unit and used for generating a sampling timing signal according to the data output signal. The sampling unit is coupled to the data output unit and the sampling timing generator and used for sampling the data output signal according to the sampling timing signal to generate a sample data signal. The detection timing generator is coupled to the data output unit and used for generating a detection timing signal according to the data output signal. The comparing unit is coupled to the input terminal, the sampling unit, and the detection timing generator and used for comparing the data reception signal with the sample data signal according to the detection timing signal, to determine a contention state of the bidirectional bus.

The present invention further discloses a method of detecting contention of a bidirectional bus used for transmitting a data output signal and receiving a data reception signal. The method includes generating a sampling timing signal according to the data output signal, sampling the data output signal according to the sampling timing signal, to generate a sample data signal, generating a detection timing signal according to the data output signal, and then comparing the data reception signal with the sample data signal according to the detection timing signal, to determine a contention state of the bidirectional bus.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
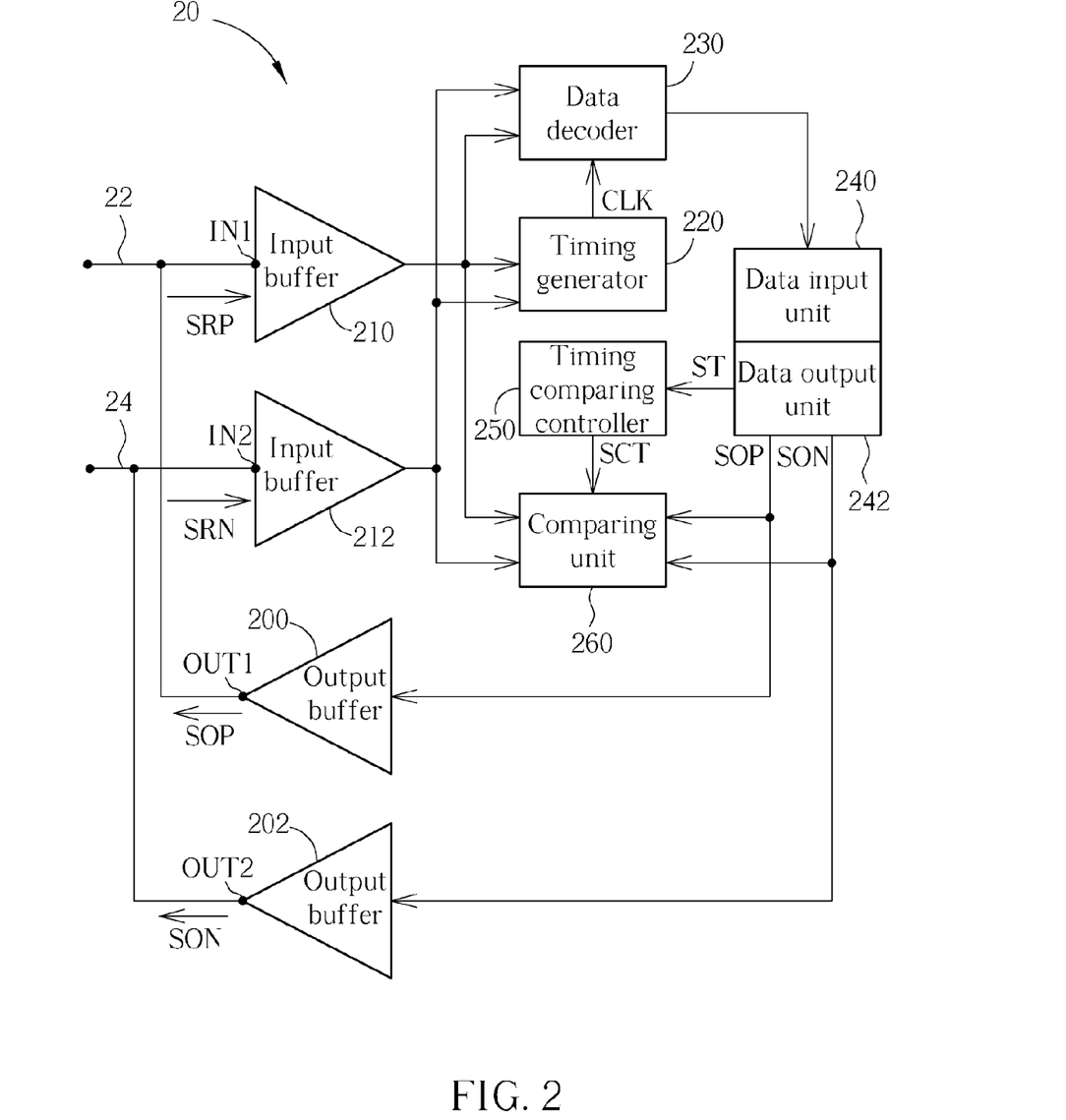
FIG. 2 is a schematic diagram of an electronic device according to a first embodiment of the present invention.

Please refer to FIG. 2, which is a schematic diagram of an electronic device 20 according to a first embodiment of the present invention. In this embodiment, the electronic device 20 is installed in a slave device and responsible for detecting bus contention on bidirectional links 22 and 24 of a half-duplex bidirectional bus. The electronic device 20 includes output terminals OUT1 and OUT2, input terminals IN1 and IN2, output buffers 200 and 202, input buffers 210 and 212, a timing generator 220, a data decoder 230, a data input unit 240, a data output unit 242, a timing comparing controller 250 and a comparing unit 260. The input terminals IN1 and IN2 are adapted to receive data reception signals SRP and SRN from the bidirectional links 22 and 24 respectively. The input buffers 210 and 212, both preferably a Schmitt trigger, determine signal levels of the data reception signals SRP and SRN according to a plurality of predetermined signal levels for signal equalization. The signals transmitted on the bidirectional links 22 and 24, irrespective of the signals received or outputted by the electronic device 20, are complementary signals. That is, one bidirectional link transmits a "0" data signal, and the other bidirectional link transmits a "1" data signal. With this complementary transmission feature, the timing generator 220 performs exclusive-OR (XOR) logic operation to the data reception signals SRP and SRN to obtain an embedded clock signal CLK used as a system clock of the electronic device 20. In addition, the data decoder 230 decodes instructions embedded in the data reception signals SRP and SRN according to the clock signal CLK. The data input unit 240 transfers the decoded instructions to back-end devices, such as a central processing unit. The data output unit 242 provides data output signals SOP and SON sent out by the back-end devices. The output buffers 200 and 202 temporarily store the data output signals SOP and SON respectively. The output terminals OUT1 and OUT2 outputs the data output signals SOP and SON to the bidirectional links 22 and 24.

To detect bus contention, the data output unit 242 generates a transition signal ST when detecting a signal transition of either the data output signal SOP or SON. The timing comparing controller 250 preferably includes delay units for delaying the transition signal ST to generate a timing comparison signal SCT. The comparing unit 260 compares the data reception signal SRP with the data output signal SOP and also compares the data reception signal SRP with the data output signal SOP according to the timing comparison signal SCT to determine contention states of the bidirectional links 22 and 24 respectively. The contention state of the bidirectional links 22 is determined as below for example. When the data output signal SOP is outputted to the bidirectional links 22, the related contention state is determined to "no collision" if a waveform of the data reception signals SRP received by the comparing unit 260 is identical with a waveform of the data output signal SOP since the output terminal OUT1 is coupled to the input terminal IN1. On the contrary, the contention state is determined to "collision" if the waveform of the data reception signals SRP is different from the waveform of the data output signal SOP. The waveform difference is incurred because the data output signal SOP on the bidirectional links 22 is further driven by a remote device, such as a master device.

Figure 3:
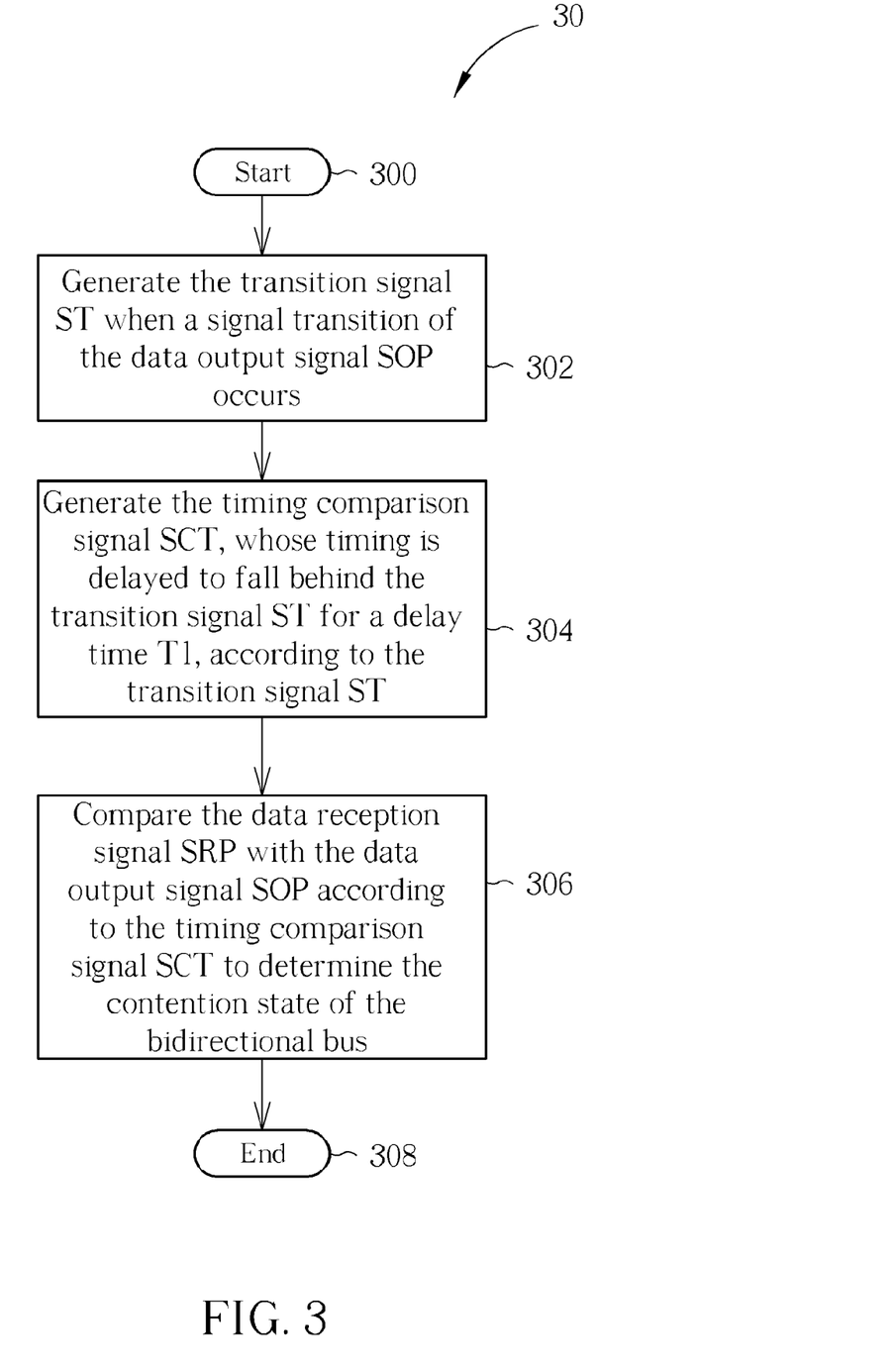
FIG. 3 is a flowchart of a process according to an embodiment of the present invention.

Please refer to FIG. 3, which illustrates a flowchart of a process 30 according to an embodiment of the present invention. The process 30 is used in the electronic device 20 for detecting the contention state of the bidirectional links 22 transmitting the data output signal SOP or receiving data reception signal SRP. The process 30 includes the following steps:

Step 300: Start.

Step 302: Generate the transition signal ST when a signal transition of the data output signal SOP occurs.

Step 304: Generate the timing comparison signal SCT, whose timing is delayed to fall behind the transition signal ST for a delay time T1, according to the transition signal ST.

Step 306: Compare the data reception signal SRP with the data output signal SOP according to the timing comparison signal SCT to determine the contention state of the bidirectional bus 22.

Step 308: End.

According to the process 30, the embodiment of the present invention generates the transition signal ST when the signal transition of the data output signal SOP occurs, and thereby generates the timing comparison signal SCT for comparing a logic state of the data reception signal SRP with the logic state of the data output signal SOP, so as to determine the contention state of the bidirectional bus 22. The further detailed operation of the process 30 can be referred by the above description about the electronic device 20 and is omitted herein. In addition, the process 30 is applicable for detection of the contention state of bidirectional links 24 as well.

Figure 4:
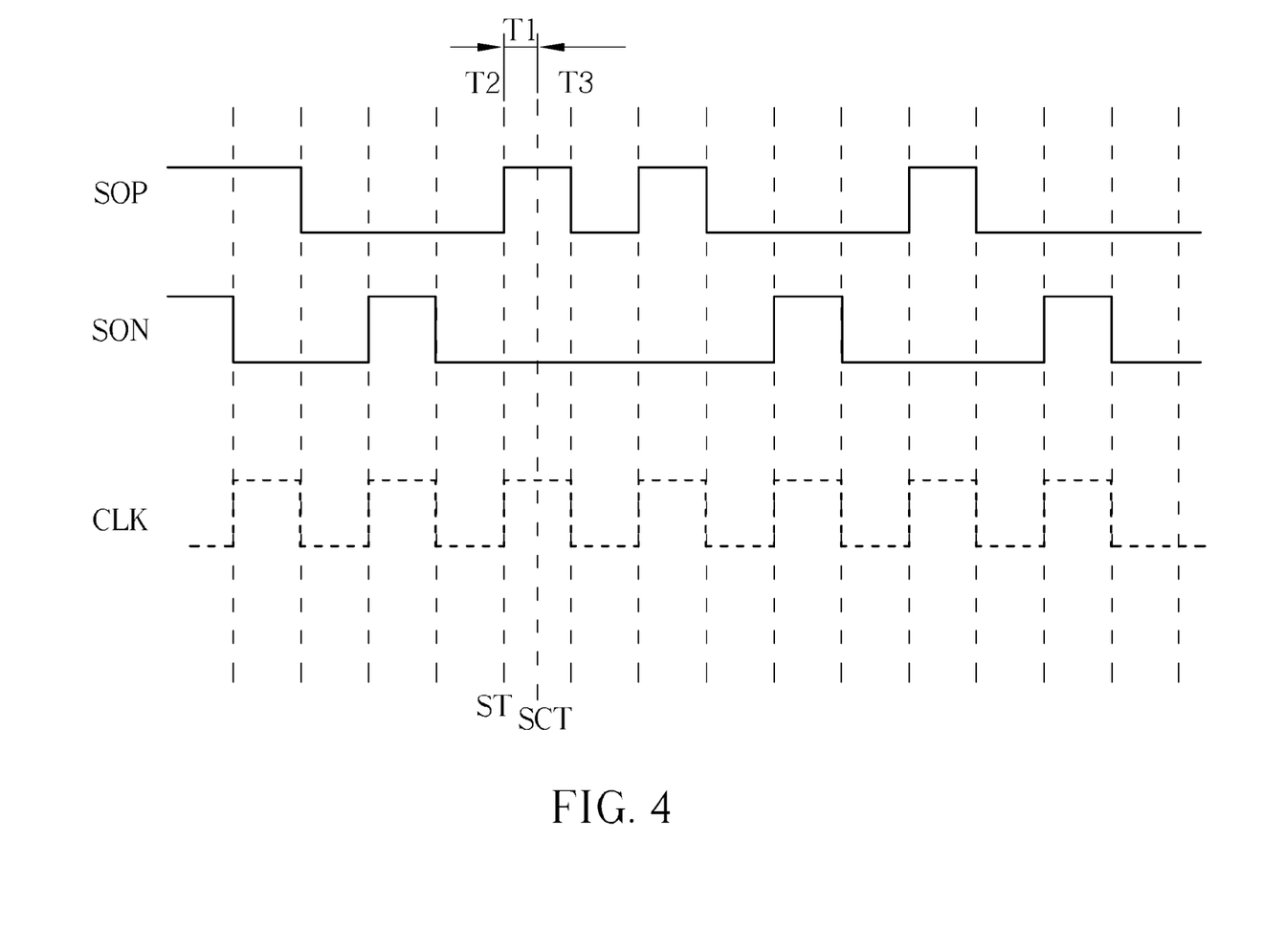
FIG. 4 is a schematic diagram of related signal waveforms of the electronic device according to FIG. 2.

Please refer to FIG. 4, which is a schematic diagram of related signal waveforms of the electronic device 20. The related waveforms from top to bottom are the data output signals SOP and SON, and the clock signal CLK obtained by performing XOR operation to the data output signals SOP and SON. In FIG. 4, a signal transition of the data output signal SOP at time T2 is used as an example for explanation of the concept of the present invention. When the data output signal SOP transits at time T2, the data output unit 244 generates the transition signal ST. The timing comparing controller 250 generates the timing comparison signal SCT a delay time T1 after the time T2 for signal comparison. Preferably, the delay time T1 is less than time different of two consecutive signal transitions, such as the time difference of the time T2 and the time T3.

As can been seen from the above, the embodiment of the present invention firstly detects the transition of the data output signal and then compares the data reception signal with the data output signal a predetermined delay time after the transition.

Please note that the way the timing comparing controller 250 generates the timing comparison signal SCT is not intended to limit the scope of the present invention, but to accord with principles and features of the claimed present invention. The timing comparing controller 250 can also generate the timing comparison signal SCT according to other features of the data output signal, such as signal level differences or a processed data output signal, so as to appropriately control the comparing timing of the comparing unit 260.

Figure 5:
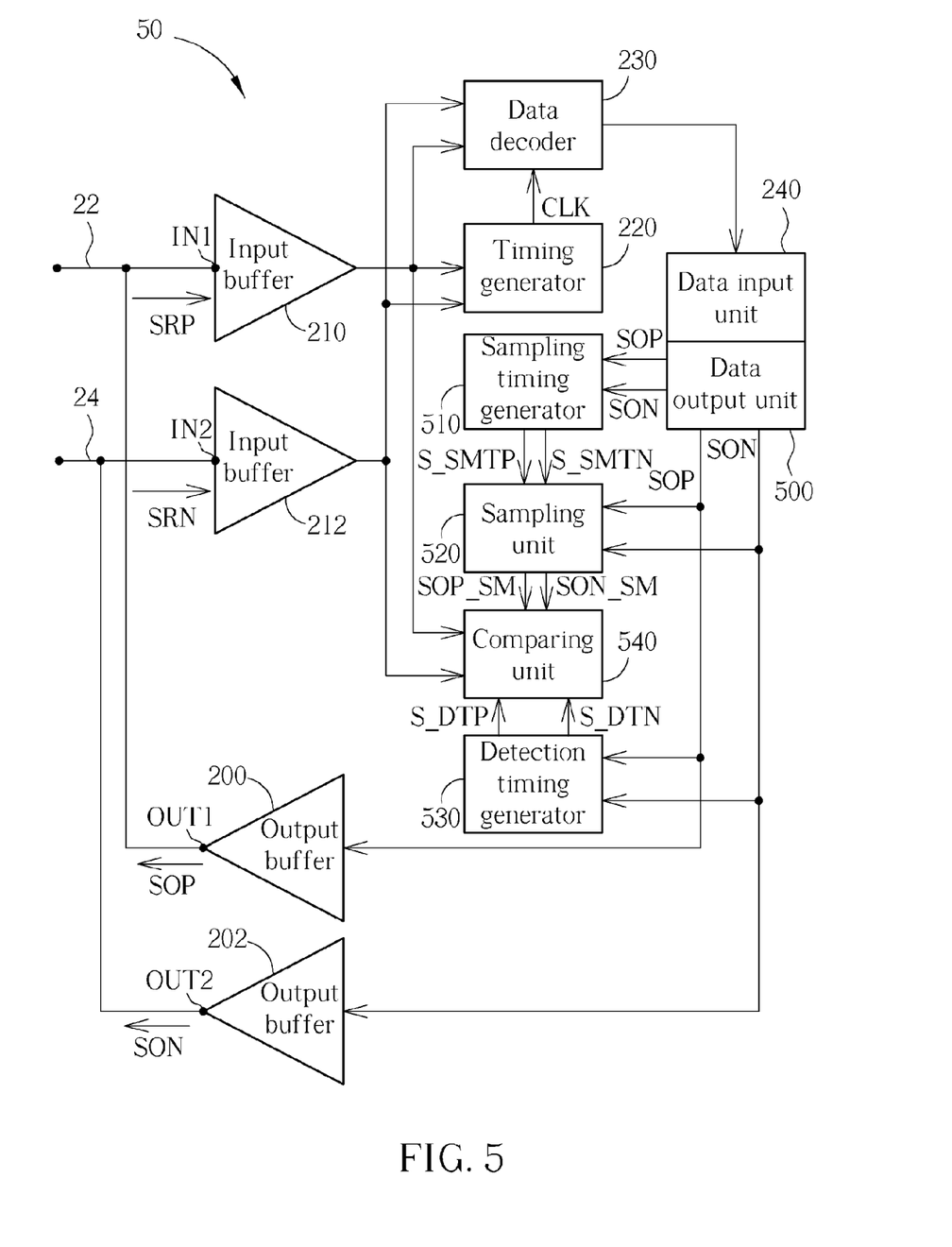
FIG. 5 is a schematic diagram of an electronic device according to a second embodiment of the present invention.

Please refer to FIG. 5, which is a schematic diagram of an electronic device 50 according to a second embodiment of the present invention. Parts of elements in the electronic device 50 are identical with the corresponding elements in the electronic device 20, and thereby the associated detailed descriptions about operations are omitted. The electronic device 50 is also used for detecting contentions of the bidirectional links 22 and 24 and includes output terminals OUT1 and OUT2, input terminals IN1 and IN2, output buffers 200 and 202, input buffers 210 and 212, a timing generator 220, a data decoder 230, a data input unit 240, a data output unit 500, a sampling timing generator 510, a sampling unit 520, a detection timing generator 530 and a comparing unit 540. The data output unit is used for providing the data output signals SOP and SON for the sampling timing generator 510, the sampling unit 520, and the detection timing generator 530. The sampling timing generator 510 generates a sampling timing signal S_SMTP according to a signal transition of the data output signal SOP and also generates a sampling timing signal S_SMTN according to a signal transition of the data output signal SON. The sampling unit 520 samples the data output signal SOP/SON according to the sampling timing signal S_SMTP/S_SMTN to generate and provide sample data signals SOP_SM/SON_SM for the comparing unit 540. The detection timing generator 530 generates a detection timing signal S_DTP/S_DTN when the transition of the data output signal SOP/SON occurs. The comparing unit 540 compares the data reception signal SRP/SRN with the sampling data signal SOP_SM/SON_SM according to the detection timing signal S_DTP/S_DTN, to determine contention states of the bidirectional links 22 and 24. Please note that, for correct comparison, the comparing unit 540 neglects the detection timing signals generated in the first transitions of the data output signals SOP and SON.

Figure 6:
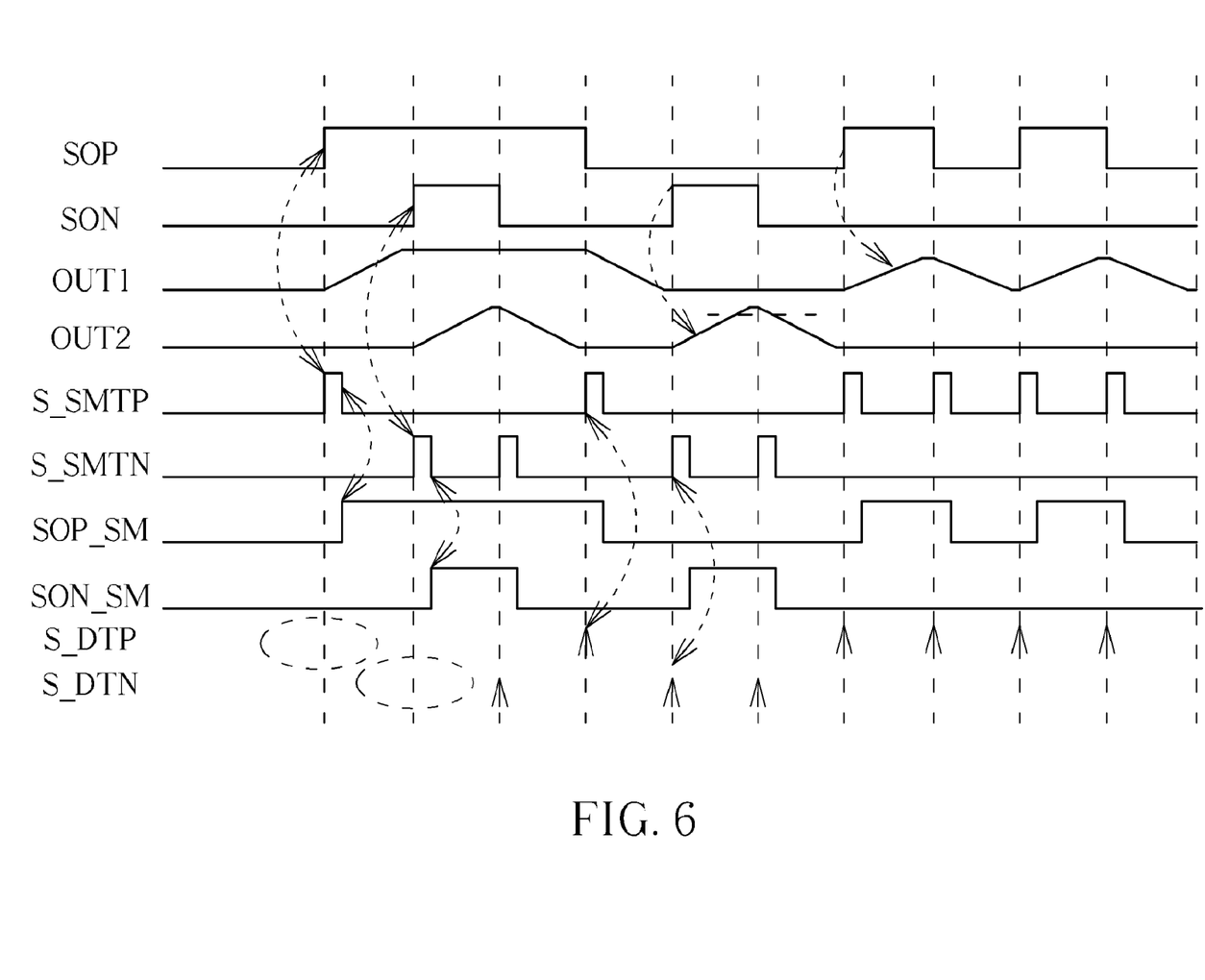
FIG. 6 is a schematic diagram of related signal waveforms of the electronic device according to FIG. 5.

Please refer to FIG. 6, which is a schematic diagram of related signal waveforms of the electronic device 50. The related waveforms from top to bottom are the data output signals SOP and SON, signals of the output terminals OUT1 and OUT2, the sampling timing signals S_SMTP and S_SMTN, the sampling signals SOP_SM and SON_SM, and the detection timing signals S_DTP and S_DTN. Due to load effect, the waveforms of the data output signals SOP and SON outputted by the output buffers 200 and 202 become the signal waveforms of the output terminals OUT1 and OUT2 respectively. Take the signals corresponding to the bidirectional link 22 for example. When the data output signal SOP transits, the sampling timing signal S_SMTP is generated for sampling of the data output signal SOP, thereby generating the sampling signal SOP_SM. On the other hand, each time the data output signal SOP transits, the detection timing signal S_DTP is generated for comparison of the data reception signal SRP and the sampling signal SOP_SM. Furthermore, the embodiment of the present invention neglects the detection timing signals S_DTP and S_DTN generated according to the first transition of the data output signals SOP and SON, and thus no detection timing signals S_DTP and S_DTN are generated in FIG. 6 at the corresponding first signal transitions.

Similar to the contention principle of the electronic device 20, the contention state of the bidirectional link 22 is determined to "no contention" when the data reception signal SRP and the sampling signal SOP_SM are detected having the same waveforms during a certain clock cycle.

As shown in FIG. 6, for the data output signal having a rise-fall waveform, the electronic device 50 performs sampling when detecting a rising edge of the data output signal and then compares the data reception signal with the sampling signal at the falling edge.

Figure 7:
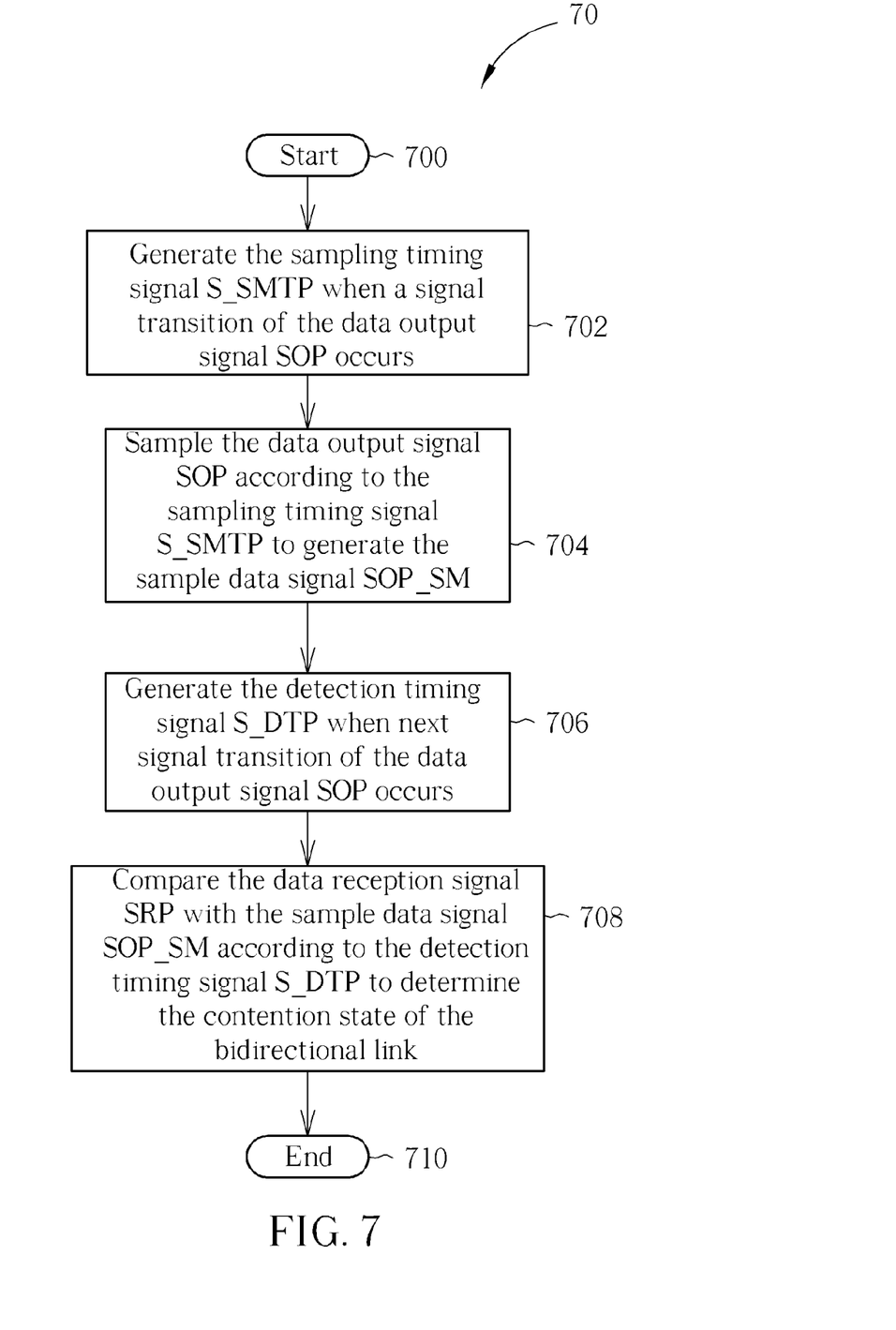
FIG. 7 is a flowchart of a process according to an embodiment of the present invention.

Please refer to FIG. 7, which illustrates a flowchart of a process 70 according to an embodiment of the present invention. The process 70 is used in the electronic device 50 for detecting the contention state of the bidirectional links 22 transmitting the data output signal SOP or receiving data reception signal SRP. The process 70 includes the following steps:

Step 700: Start.

Step 702: Generate the sampling timing signal S_SMTP when a signal transition of the data output signal SOP occurs.

Step 704: Sample the data output signal SOP according to the sampling timing signal S_SMTP to generate the sample data signal SOP_SM.

Step 706: Generate the detection timing signal S_DTP when next signal transition of the data output signal SOP occurs.

Step 708: Compare the data reception signal SRP with the sample data signal SOP_SM according to the detection timing signal S_DTP to determine the contention state of the bidirectional link 22.

Step 710: End.

According to the process 70, the embodiment of the present invention generates the sampling timing signal S_SMTP when the signal transition of the data output signal SOP occurs, and thereby samples the data output signal SOP to generate the sample data signal SOP_SM. When next signal transition of the data output signal SOP occurs, the embodiment of the present invention generates the detection timing signal S_DTP controlling the time of comparing the data reception signal SRP with the sample data signal SOP_SM, so as to determine the contention state. The further detailed operation of the process 70 can be referred by the above description about the electronic device 50 and is omitted herein. In addition, the process 70 is applicable for detection of the contention state of bidirectional links 24 as well.

In conclusion, the first embodiment of the present invention detects the bus contention state a delay time later after any signal transition of the data output signal occurs. The second embodiment of the present invention samples the data output signal at the first signal transition of two consecutive signal transitions of the data output signal and then perform signal comparison at the second signal transition to detect the bus contention state. Therefore, the embodiments of the present invention avoid bus driving failure caused by contentions.

Those skilled in the art will readily observe that numerous modifications and alterations of the device and method may be made while retaining the teachings of the invention.

What is claimed is:

1. An electronic device of detecting contention of a bidirectional bus, the electronic device consisting of:
   an output terminal coupled to the bidirectional bus, for outputting a data output signal to the bidirectional bus;
   an input terminal coupled to the output terminal and the bidirectional bus, for receiving a data reception signal from the bidirectional bus;
   a data output unit for providing the data output signal;
   a sampling timing generator coupled to the data output unit, for generating a sampling timing signal according to the data output signal;
   a sampling unit coupled to the data output unit and the sampling timing generator, for sampling the data output signal according to the sampling timing signal, to generate a sample data signal;
   a detection timing generator coupled to the data output unit, for detecting a transition of the data output signal and generating a detection timing signal accordingly when the transition of the data output signal is detected; and
   a comparing unit coupled to the input terminal, the sampling unit and the detection timing generator, for comparing the data reception signal with the sample data signal according to the detection timing signal, to determine a contention state of the bidirectional bus;

wherein the transition of the data output signal is a rising or falling edge of the data output signal and the comparing unit neglects the detection timing signal generated according to a first transition of the data output signal.

2. The electronic device of claim 1 further comprising an input buffer coupled between the input terminal and the comparing unit, for determining a signal level of the data reception signal according to the plurality of predetermined signal levels.

3. The electronic device of claim 1 further comprising an output buffer coupled between the output terminal and the data output unit, for temporarily storing the data output signal.

4. The electronic device of claim 1, wherein the bidirectional bus is a half-duplex bidirectional bus.

5. A method of detecting contention of a bidirectional bus used for transmitting a data output signal and receiving a data reception signal, the method consisting of:
generating a sampling timing signal according to the data output signal;
sampling the data output signal according to the sampling timing signal, to generate a sample data signal;
detecting a transition of the data output signal and generating a detection timing signal accordingly when the transition of the data output signal is detected; and
comparing the data reception signal with the sample data signal according to the detection timing signal, to determine a contention state of the bidirectional bus;
wherein the transition of the data output signal is a rising or falling edge of the data output signal and the detection timing signal generated according to a first transition of the data output signal is neglected.

6. The method of claim 5 further comprising determining a signal level of the data reception signal according to the plurality of predetermined signal levels before comparing the data reception signal with the sample data signal according to the detection timing signal.

7. The method of claim 5 further comprising temporarily storing the data output signal before the bidirectional bus transmits the data output signal.

8. The method of claim 5, wherein the bidirectional bus is a half-duplex bidirectional bus.

* * * * *